US008331663B2

(12) United States Patent
Subramaniam

(10) Patent No.: US 8,331,663 B2
(45) Date of Patent: Dec. 11, 2012

(54) EFFICIENT IMAGE COMPRESSION SCHEME TO MINIMIZE STORAGE AND BUS BANDWIDTH REQUIREMENTS

(75) Inventor: Vijay Subramaniam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1127 days.

(21) Appl. No.: 11/855,578

(22) Filed: Sep. 14, 2007

(65) Prior Publication Data

US 2009/0003714 A1 Jan. 1, 2009

Related U.S. Application Data

(60) Provisional application No. 60/946,972, filed on Jun. 28, 2007.

(51) Int. Cl.
*G06K 9/36* (2006.01)
*G06K 9/46* (2006.01)

(52) U.S. Cl. ........................................ 382/166; 382/233

(58) Field of Classification Search ........................ None
See application file for complete search history.

(56) References Cited

U.S. PATENT DOCUMENTS 5,166,987 A * 11/1992 Kageyama .................... 382/250
5,793,314 A 8/1998 Auyeung
5,838,817 A * 11/1998 Funada ......................... 382/166
5,878,168 A * 3/1999 Kondo et al. ................ 382/232
6,058,217 A * 5/2000 Kondo .......................... 382/251
6,259,811 B1 * 7/2001 Tsuji ............................ 382/166
6,873,739 B2 * 3/2005 Cho et al. ...................... 382/240
7,146,044 B2 * 12/2006 Asamura et al. .............. 382/167
7,155,057 B2 * 12/2006 Kondo .......................... 382/166
(Continued)

FOREIGN PATENT DOCUMENTS

JP 61147689 A 7/1986
(Continued)

OTHER PUBLICATIONS

Charilaos Christopoulos et al., “The JPEG2000 still image coding system: An Overview,” IEEE Transactions on Consumer Electronics, Joint Photographic Expert Group Conference, Crowborough : JPEG Forum Ltd, GB, vol. 46, No. 4, Jan. 29, 2001, pp. 1103-1127, XP017205128.

(Continued)

*Primary Examiner* — Samir Ahmed
(74) *Attorney, Agent, or Firm* — Matthew J. Evans; James R. Gamble, Jr.

(57) ABSTRACT

A method of encoding receives an image and tiles the image into a set of tiles. Each tile includes a set of pixels. The method selects a first tile and determines a first set of values for the pixels in the first tile. The method separates the determined values of each pixel in the first tile into several streams. For a first stream, the method determines a bias value, and subtracts the bias value from each value within the stream, thereby generating a set of subtracted values. Typically, the subtracted values have one or more leading zeros, and the method preferably removes one or more of the leading zeros, thereby reducing the number of bits required to represent the subtracted values within the first stream. Thus, one or more of the values within the first stream is advantageously represented with fewer bits. Additional embodiments include an encoder for encoding data by using a reduced number of bits, and a system, and decoder, for transmission, reception, display, storage and/or retrieval.

21 Claims, 14 Drawing Sheets

U.S. PATENT DOCUMENTS

| | | | | |
|---|---|---|---|---|
| 7,764,832 | B2 * | 7/2010 | Glickman | 382/166 |
| 2002/0031275 | A1 * | 3/2002 | Cho et al. | 382/240 |
| 2004/0136600 | A1 * | 7/2004 | Yfantis | 382/232 |
| 2005/0128499 | A1 * | 6/2005 | Glickman | 358/1.9 |
| 2009/0290045 | A1 * | 11/2009 | Fukuda et al. | 348/231.99 |

FOREIGN PATENT DOCUMENTS

| | | | |
|---|---|---|---|
| JP | 63070682 | A | 3/1988 |
| JP | 4061591 | A | 2/1992 |
| JP | 10032495 | A | 2/1998 |
| JP | 10032838 | A | 2/1998 |
| JP | 11187275 | A | 7/1999 |
| JP | 2000188552 | A | 7/2000 |
| JP | 2003189109 | A | 7/2003 |
| JP | 2003235039 | A | 8/2003 |
| JP | 2003259393 | A | 9/2003 |
| WO | WO9300635 | A1 | 1/1993 |

OTHER PUBLICATIONS

International Search Report and Written Opinion—PCT/US2008/068010, International Search Authority—European Patent Office—Dec. 30, 2008.

Wallace G K: "The JPEG Still Picture Compression Standard" IEEE Transactions on Consumer Electronics, IEEE Service Center, NY, US vol. 38, No. 1, Feb. 1, 1992, p. XVIII-XXXIV, XP000297354.

Richardson et al.,"H.264 and MPEG-4 Video Compression: Video Coding for Next Generation Multimedia", Wiley, Sep. 6, 2004, pp. 55-58.

European Search Report—EP08006408—Search Authority—Munich—Jan. 29, 2009.

Taiwan Search Report—TW097124394—TIPO—Mar. 3, 2012.

* cited by examiner

201

200

Roost Mobile qc
Vplayer Friends wanted
Starcraft diablo2 Adobe text
Icons hp hp1
hp2

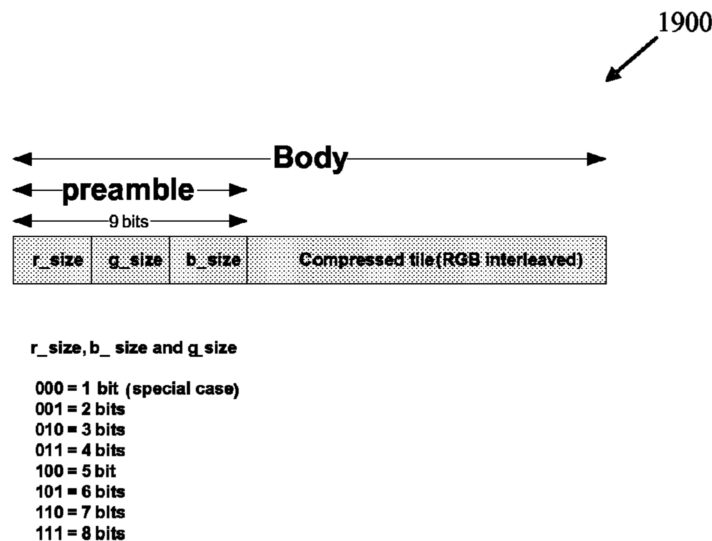

*Figure 19*

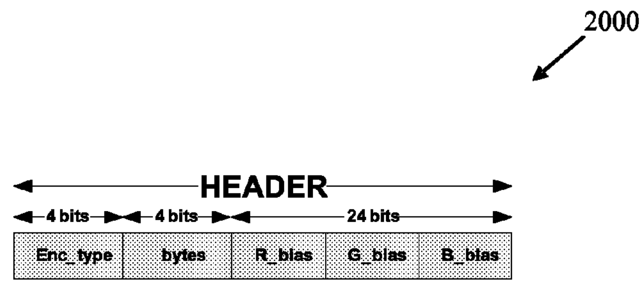

Encode_type
xBGR
0000 = Don't fetch body
0001 = r_size+ Red only
0010 = g_size+ Green only
0011 = r_size+g_size+ Red and Green
0100 = b_size+ Blue only
0101 = b_size+r_size+ Blue and Red
0110 = b_size+g_size+ Blue and Green only
0111 = r_size+b_size+g_size+Red, Blue and Green
1000 = Fetch body but no rsize,g_ size or b_ size present
( size = 8 bits assumed for all colors )
1 xxx = Future encoding scheme Bytes
0000 = Reserved
0001 = 8 bytes
0010 = 16 bytes
0011 = 24 bytes
0100 = 32 bytes
0101 = 40 bytes
0110 = 48 bytes
0111 = 56 bytes
1 xxx = Future encoding

*Figure 20*

EFFICIENT IMAGE COMPRESSION SCHEME TO MINIMIZE STORAGE AND BUS BANDWIDTH REQUIREMENTS

This application claims the benefit of U.S. Provisional Application No. 60/946,972, filed Jun. 28, 2007, the entire content of which are hereby incorporated by reference.

TECHNICAL FIELD

The present invention relates to the field of digital video, and more particularly relates to an efficient encoding scheme to minimize storage and bandwidth requirements.

BACKGROUND

There has been a wireless electronics revolution in recent years due to the rapid advancements and adoption of many new digital wireless communication protocols. For example, Code Division Multiple Access (CDMA) and Global System for Mobile communication (GSM) have greatly increased the popularity of digital cellular telephones, Wi-Fi local area network (LAN) protocols, such as 802.11b, 802.11g, 802.11a, etc., have revolutionized wireless computer networks, and Bluetooth has provided a very useful short range wireless digital protocol for many different digital devices.

The advancement in wireless protocols has spawned a field of portable electronic devices that are capable of downloading, displaying, storing, and/or retrieving increasingly large amounts of data. Hence, modern mobile devices typically employ a variety of multimedia applications and data. Modern portable and/or mobile devices use system-on-a-chip or system on chip (SoC or SOC) technology, which advantageously integrates many components of a computer or other electronic system into a single integrated circuit, or IC chip. The single chip often contains digital, analog, mixed-signal, and often radio-frequency (RF) functions, and all on the one chip. Embedded systems often take advantage of system-on-chip technology. However, such systems conventionally have limited capabilities particularly in the areas of storage and/or bus bandwidth.

Meanwhile, multimedia applications can use significant amounts of bandwidth and storage resources. For instance, the transmission and/or display of digital video frames require memory, buffers, channels, and buses that can support a large volume of bits. Conventionally, image data is presented in frames comprising many pixels. Generally, higher resolution images use large numbers of pixels. Moreover, each pixel is represented by using a set of coefficients to describe the properties of the pixel such as the color, or luminance, or chrominance, for example. For color images, three coefficients of eight bits each are conventionally used for a single pixel. In a red-green-blue system (RGB), and variants thereof, 24 bits are used to represent each color, which is sometimes referred to as 24-bit pixel depth. Increasing the resolution, display size, or other qualities of a broadcast, further increases display frame size or other requirements. In particular, modern devices and broadcasts are capable of multimedia information that exceeds the traditional QVGA, VGA to XGA formats.

Higher data rate broadband transmission places even further demands on any system. For example, the bandwidth situation becomes worse when a LCD controller must support reading frame buffers at refresh rates approaching 100 Hz. Moreover, storage and/or retrieval of multimedia data that is used by the multimedia applications present similar problems. Previous attempts to address the issues described above have used compression techniques like run length encoding (RLE) and variants of run length encoding. However, these previous attempts suffer from a variety of drawbacks.

SUMMARY

An efficient frame buffer compression scheme minimizes the storage, bus bandwidth, and/or power consumption requirements for mobile systems, and particularly for mobile systems employing system(s)-on-a-chip. Some embodiments use a particularly efficient lossless image compression scheme, while some embodiments further employ an additional lossy encoding stage. Both the lossless compression algorithm and the optional lossy stage reduce the total storage space for an image, and hence advantageously reduce read and write bandwidth loads on the system bus. Neither the lossless, nor the lossy stages, significantly degrade image and/or video data presentation. Encoded image data is further selectively packed into a frame buffer in a tight space saving format, or alternatively, in a randomly addressed and/or accessed format such as, a tile based or a stripe based format, for example.

Accordingly, a method of data compression receives an image and tiles the image into a set of tiles. Each tile includes a set of pixels. The method selects a first tile and determines a first set of values for the pixels in the first tile. The method separates the determined values of each pixel in the first tile into a plurality of streams. For a first stream, the method determines a bias value, and subtracts the bias value from each value within the stream, thereby generating a set of subtracted values. Typically, the subtracted values have one or more leading zeros, and the method preferably removes at least some of the leading zeros, thereby reducing the number of bits required to represent the subtracted values within the first stream. Thus, one or more of the values within the first stream is advantageously represented with fewer bits.

In a particular embodiment, the method determines a minimum value for the values in a stream, and the bias value is the minimum value in the stream of values. The stream of values generally relates to the pixels in a tile. These values typically include a coefficient for an attribute of a pixel. For example, the values are sometimes color values for a red-green-blue (RGB) color system, or alternatively, another type of value, such as for a luminance, chrominance, or other sampled or scaled system (YCrCb).

The method of some embodiments includes multiple levels of encoding and/or compression. More specifically, some of these embodiments round and/or truncate the subtracted values thereby generating a set of rounded or truncated values, and divide the rounded values by a factor. In a particular embodiment, the values are rounded to an even number, such as a nearest even number, and then divided by two. Preferably, the divide operation is performed by shifting bits. Once encoded, the image data is packed into a frame buffer by using a variety of means. Tightly packing the frame buffer, places the image tile data into the frame buffer sequentially, which conserves storage space and bus usage. Alternatively, loosely packing the tile data allows for random access to each tile of image (pixel) data. As a further alternative, the image data is striped in the loosely packed, but randomly accessed and/or addressable format.

The first stream preferably comprises a set of coefficients for indicating a first color for the pixels of the first tile. Hence, for the first stream, some embodiments advantageously determine whether the bias value includes sufficient coefficient information to reconstruct the first color. If the bias value includes sufficient coefficient information to reconstruct the first color, then these embodiments encode the first color into a packet header by using the bias value, but forego an encoding of the coefficients for the first color within a packet body. Further, an encoding type is selected for indicating whether a header includes sufficient pixel information to faithfully reconstruct the first color of the first tile. Hence, a decoder fetches the packet header, thereby receiving the encoding type, and decodes the first color by using the encoding type. If the encoding type indicates that the packet header includes sufficient information to reconstruct the first color, then the method advantageously foregoes a step of fetching the information for the first color from the packet body.

In view of the foregoing, the encoding type of particular implementations includes one or more of the following: a first selection for a condition where no color information for the first tile is encoded in the packet body; a second selection for a condition where the information for one color is encoded in the packet body; a third selection for a condition where the information for two colors is encoded in the packet body; and/or a fourth selection for a condition where the information for three colors is encoded in the packet body. In certain cases, the color information includes, for instance, a luminance value and/or a chrominance value.

In additional embodiments, an encoder includes a first stage that has a memory and a stats block. Each of the memory and the stats block receive a set of input data. The input data, in one implementation, includes a set of pixel coefficients corresponding to a stream from a tile, for example. The stats block is configured to sort the input data such as, for example, from low to high. The encoder also includes a first subtractor coupled to an output of the memory and to an output of the stats block. The first subtractor is for performing an arithmetic operation on the output of the memory and the output of the stats block. For instance, in a particular case, the stats block outputs a minimum value, and the subtractor subtracts the minimum value from a stream of values from the memory. Preferably, the minimum value, or bias value, is the minimum value within the stream as determined by a sort function performed by the stats block.

The encoder further includes a first logic unit coupled to the subtractor. The first logic unit is for receiving the output of the subtractor and outputting a set of bits that has a selected format. Accordingly, the encoder has a packer coupled to the logic unit for receiving the set of bits in the selected format. The packer uses the selected set of bits for forming a data packet. Preferably, the first logic unit is configured to output a reduced number of bits based on a particular data stream. For instance, in some implementations, the first logic unit includes a decode unit that outputs a reduced number of bits, for example, without leading zeros, by using a control signal. The control signal in these implementations is preferably provided by the stats block.

Additional embodiments include an encoder for encoding data by using a reduced number of bits, and a system, and decoder, for transmission, reception, display, storage and/or retrieval.

BRIEF DESCRIPTION OF THE DRAWINGS

The novel features of the invention are set forth in the appended claims. However, for purpose of explanation, several embodiments of the invention are set forth in the following figures.

FIG. 19 illustrates an exemplary packet for the encoding of FIG. 18.

FIG. 20 illustrates an exemplary header for the encoding of FIG. 18 and/or the packet of FIG. 19.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form to not obscure the description of the invention with unnecessary detail.

I. Method and Encoder

Some embodiments of the invention include an efficient lossless image compression scheme that minimizes storage and bus bandwidth requirements. These embodiments are particularly adapted for use with one or more systems on a chip (SOCs) for mobile systems. For instance, a particular implementation includes a simple lossless compression algorithm to reduce the total storage space for an image. The reduced storage space required for the image has additional benefits such as, for example, it reduces the read and/or write bandwidth loads on the bus, which further advantageously improves the overall performance of the system. Also described are certain frame buffer implementations that take advantage of the algorithm.

Conventionally, images that are processed and stored in memory are of the fully sampled type and occupy a full eight bits to represent a pixel in color. However, not all the pixels within an image need all of the eight bits to represent the colors faithfully. Generally, there are parts of an image that have pixels that are of similar color or that are within a smaller range of coefficient values. Some embodiments take advantage of the areas of an image that have smaller ranges in color, and thus in coefficient values. These embodiments preferably re-quantize the color coefficients by using a reduced number of bits.

One important attribute in this scheme that helps in lowering the number of bits used to store a color is a tiling process which bounds or limits any large transition in pixel values from one region of the image to another. Embodiments of the invention further desirably achieve a higher compression ratio for images that have been low pass filtered and/or images that have many regions of similar color. Further, these embodiments are applicable to a variety of data formats such as, for example, YCbCr or RGB.

Figures 1, 2:
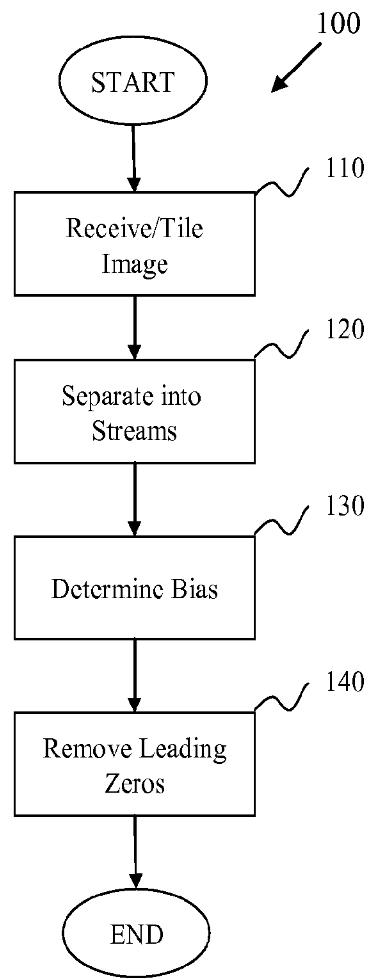
FIG. 1 illustrates a process 100 in accordance with some embodiments of the invention.
FIG. 2 illustrates a tiled image.

FIG. 1 illustrates a particular embodiment that involves a process 100 for compressing an image. As shown in this figure, the process 100 begins at the step 110, where the image is received and tiled. Preferably, tiling the image comprises dividing the image pixels into discrete sets. Then, the process 100 transitions to the step 120, where the colors for each pixel in a tile are separated. Preferably, the tile is separated into three color streams, such as red, green, and blue, for example.

In a particular embodiment, each pixel's color value is represented by using eight bits, and the color for the tile is treated as three streams of eight-bit values, one stream for each color. Hence, if each tile is of M×M size, then there are three streams of M^2 number of eight-bit values. Preferably, each stream (e.g., for red, green, and blue) is treated independently for compression.

Once the colors and streams for a tile are determined at the step 120, the process 100 transitions to the step 130, where a minimum value (the bias) for each of the color streams is determined and subtracted from each of the streams. The resulting stream of subtracted values, that is the remainder values from the subtraction, typically contains values that are smaller than the original stream.

Then, the process 100 transitions to the step 140, where the leading zeros are removed from each color stream value. Advantageously, the smaller range of values in each of the streams after the subtraction is represented with a reduced number of bits by removing the leading zeros such that the maximum value can still be represented in the remainder of the subtraction. After the step 140, the process 100 concludes.

For example, in the case where a tile is comprised of four pixels by four pixels, a single color stream for the tile contains color values for sixteen pixels. If the maximum value in the red stream is only six, for example, then by removing the leading zeros, only three bits are needed to represent each value in this stream, since the maximum value within the stream is "110" in the corresponding binary code, for this example.

II. Graphical Example

FIG. 2 illustrates the method and/or encoder described above in operation on an exemplary image 200. As shown in this figure, the image is preferably divided into tiles, such as the exemplary first tile 201. As mentioned above, the tiling step typically reduces the variation in pixel values for a stream. Moreover, from FIG. 2 it is noticeable that areas of the image do not have large variations in pixel value, such that not all values of the full eight bit pixel depth are needed to represent all the colors within the tile.

Figure 3:
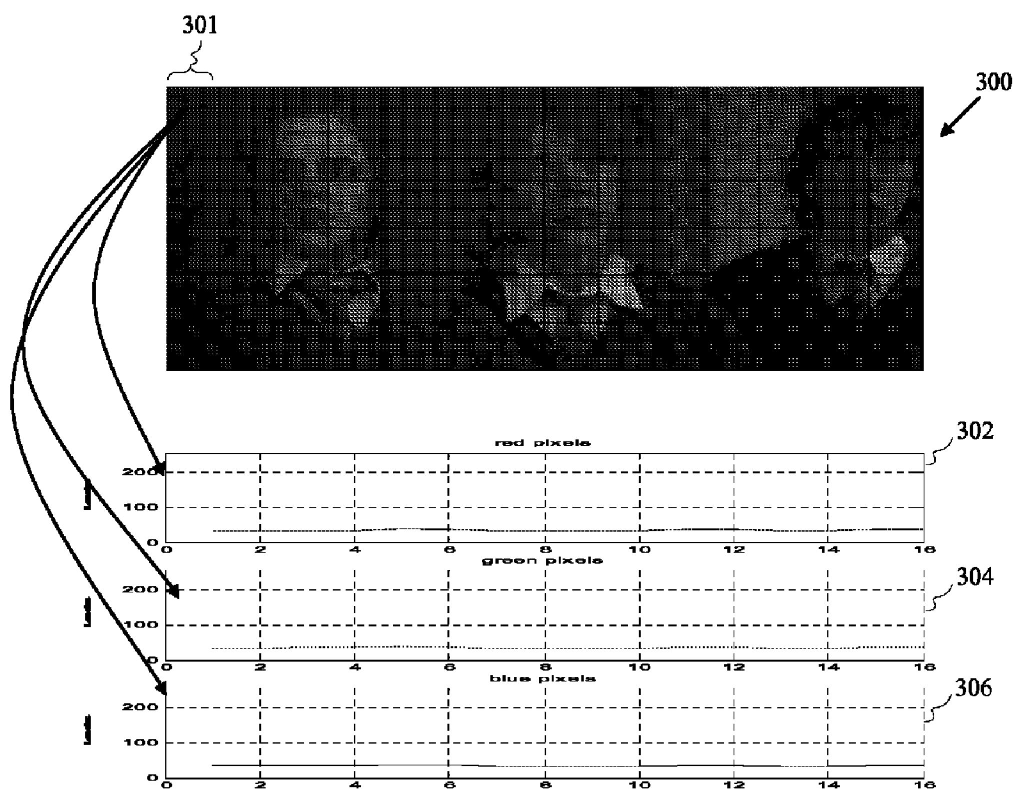
FIG. 3 illustrates the tiled image of FIG. 2 divided into three color components for each pixel in a particular tile.
Figure 4:
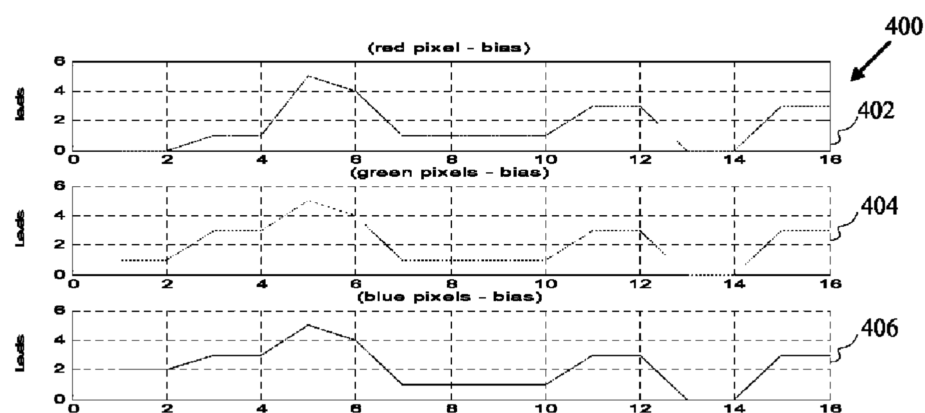
FIG. 4 illustrates three color components for each pixel after the bias is removed.

FIGS. 3 and 4 graphically illustrate how redundant information in an image 300 is reduced through the removal of bias and/or leading zeros. As shown in FIG. 3, the color components for a tile 301 are divided into three streams, namely, streams for red 302, green 304, and blue 306 color. The coefficients for each color stream are diagrammatically illustrated in a chart format. As further shown by the x-axis of the charts, a four-by-four tile has sixteen pixels, while the y-axis includes the coefficient value corresponding to a magnitude for each pixel. In FIG. 3, the raw image data is typically in an eight bit format, hence the coefficient values range from about 0 to 255.

FIG. 4 illustrates the color components of each stream 402, 404, and 406, after a bias value for each stream is determined and subtracted from the stream. Advantageously, the difference information is retained for each pixel in the tile. Accordingly, the differences between pixel coefficient values are illustrated more clearly in FIG. 4. Moreover, as shown in this figure, the largest value within the three streams (red, green, and blue) is not greater than six, hence only three bits rather than all eight bits are needed to fully represent the remainder of the subtraction that represent the pixel values. As described above in relation to FIG. 1, once the bias value is subtracted from the coefficients of each color component, the minimum necessary bit width is advantageously calculated to faithfully represent the remainder of the subtraction. Moreover, any excess leading zeros are preferably removed or concatenated, as further described below in relation to FIGS. 5 through 8.

Figure 5:
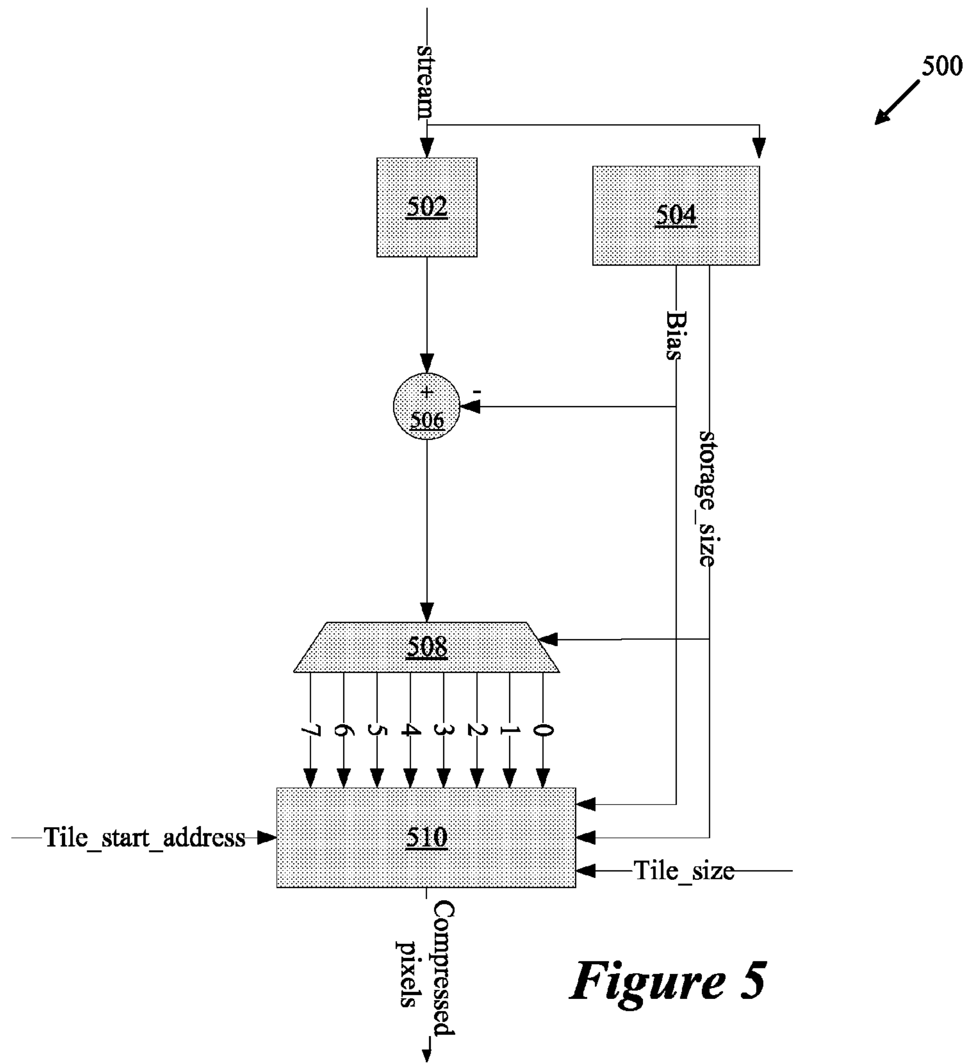
FIG. 5 illustrates an encoder according to some embodiments.

FIG. 5 illustrates a block diagram for an encoder 500 of some embodiments. The encoder 500 packs the encoded color information and the header into a tile. The header describes how to decode the tile. To achieve the foregoing, the encoder 500 includes a memory 502 and a stats block 504, which each receive an input data stream. The memory 502 typically comprises a type of random access memory (RAM) that has sufficient dimensions to store the stream values for a tile, while the stats block 504 is for sorting the values of the tile from low to high, for example.

The memory 502 outputs to a subtractor 506 that also receives a bias input from the stats block 504. Typically, the bias comprises the lowest value in the tile as determined by the stats block 504. The subtractor 506 subtracts the bias from the stream values from the memory 502, and outputs to a decoder 508. The decoder 508 advantageously outputs the minimum number of bits required to represent the result of the subtractor 506, and outputs the bits to a packer 510. The illustrated implementation includes a one-to-eight decoder 508, that outputs the minimum number of bits needed based on the storage_size received from the stats block 504. However, one of ordinary skill recognizes different implementations for the decoder 508 and other components of the system 500, including variations in bus widths and number of bits.

The packer 510 also receives a tile_start_address, the bias, a storage_size, and a tile_size (from the stats block 504), and outputs a compressed data stream for the particular tile. Preferably, the output of the packer 510 is in the form of one or more packets. The packets of these embodiments are further described in relation to FIG. 6.

Figure 6:
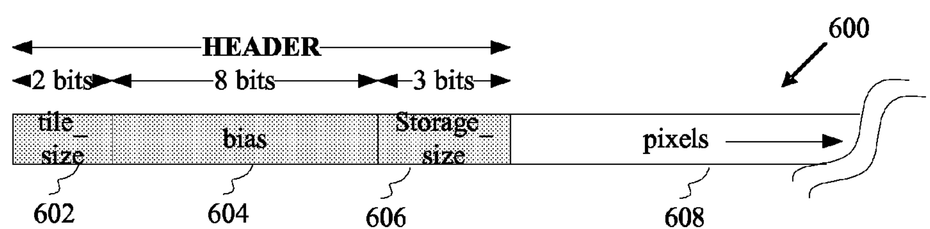
FIG. 6 illustrates a packet for the data streams of FIG. 4.

FIG. 6 illustrates a packet 600, for the streams of FIG. 4. As shown in FIG. 6, the packet 600 includes fields for tile_size 602, bias 604, storage_size 606, that form the header of the packet 600, and a field for pixel data 608. In the particular illustrated example, only three bits are needed to represent each of the tile_size and the storage_size, while eight bits are needed for the bias. The bias and the bits needed to represent the remainder are packed into the header and concatenated with the remainder values for each stream (red, green and blue).

In this example, a total of 180 bits is needed per tile, for storage, retrieval, and/or display. These 180 bits include 36 bits for the header, and 48 bits for the pixel data of each stream.

180 bits=[36 header bits+3 streams*(3 bits/pixel*16 pixels/tile)]

More specifically, the header of this example uses the following format for three parameters, namely, bias, storage_size, and tile_size:

24 bias bits=(8 bits for the bias value of each stream*3 streams)

9 storage_size bits=(3 storage_size bits for each stream*3 streams)

3 tile_size bits, since each stream in the example uses the same tile_size, only one field is needed for all three streams. Thus, the total header bits for the three streams of this example is 36 bits=(24 bias bits+9 storage_size bits+3 tile_size bits). Without compression, a total of 384 bits are needed to store the same image data.

384 bits=(16 pixels/tile*24 bits/pixel)

Thus, the compression ratio is (180 bits/384 bits) 46.6%.

One of ordinary skill will recognize many alternatives. For instance, during experiments of particular embodiments, it was determined that the 4×4 tile_size has particularly good balance between quality and performance such as processing speed and compression ratio. Hence, some embodiments fix the tile_size as 4×4 and encoding and/or passing a tile_size parameter in the overhead of the header. These embodiments then have a savings of three bits in every packet header and have an improvement in compression ratio and speed.

III. Lossy Stage Encoding

A second level of encoding is optionally performed on the remainder values to further increase the compression ratio. This second level of compression further reduces the bit width of each value in the color stream by rounding the subtracted values and dividing the values by a factor. For instance, the values are rounded to the nearest even number, and/or divided by two, in a particular embodiment. Hence, the second compression is lossy because the odd valued remainder values, after the subtraction of the bias from the pixel coefficient values in the original tile, will loose one quantization level or one least significant bit (LSB) during the process of encoding and decoding (dividing by two by the encoder and multiplying by two by the decoder). However, only the pixels having odd coefficients will experience a small degree of loss, and none of the even coefficients will have any loss, under this implementation.

Moreover, as further discussed below, experiments testing this implementation indicate that the loss of information causes no visually noticeable effect. Yet, the second compression stage advantageously results in an improvement of up to 12.5% in the compression ratio. Also, the second compression is selectively enabled or disabled such as by software, for example, depending on a desired image quality, and/or a desired compression ratio. Further, the divisor factor is preferably any multiple of two, such as four, eight, and sixteen, for example. Larger factors result in higher lossy stage compression, and with a corresponding loss of quality. However, the lower resolution of reduced pixel information is desirable at times, such as in a preview, low power, and/or standby mode. A bit shifter conveniently provides the divide function in digital logic, to easily implement a selectable N-bit lossy encoder, where the shifter shifts one least significant bit, for a 1-bit lossy encoder.

Figure 7:
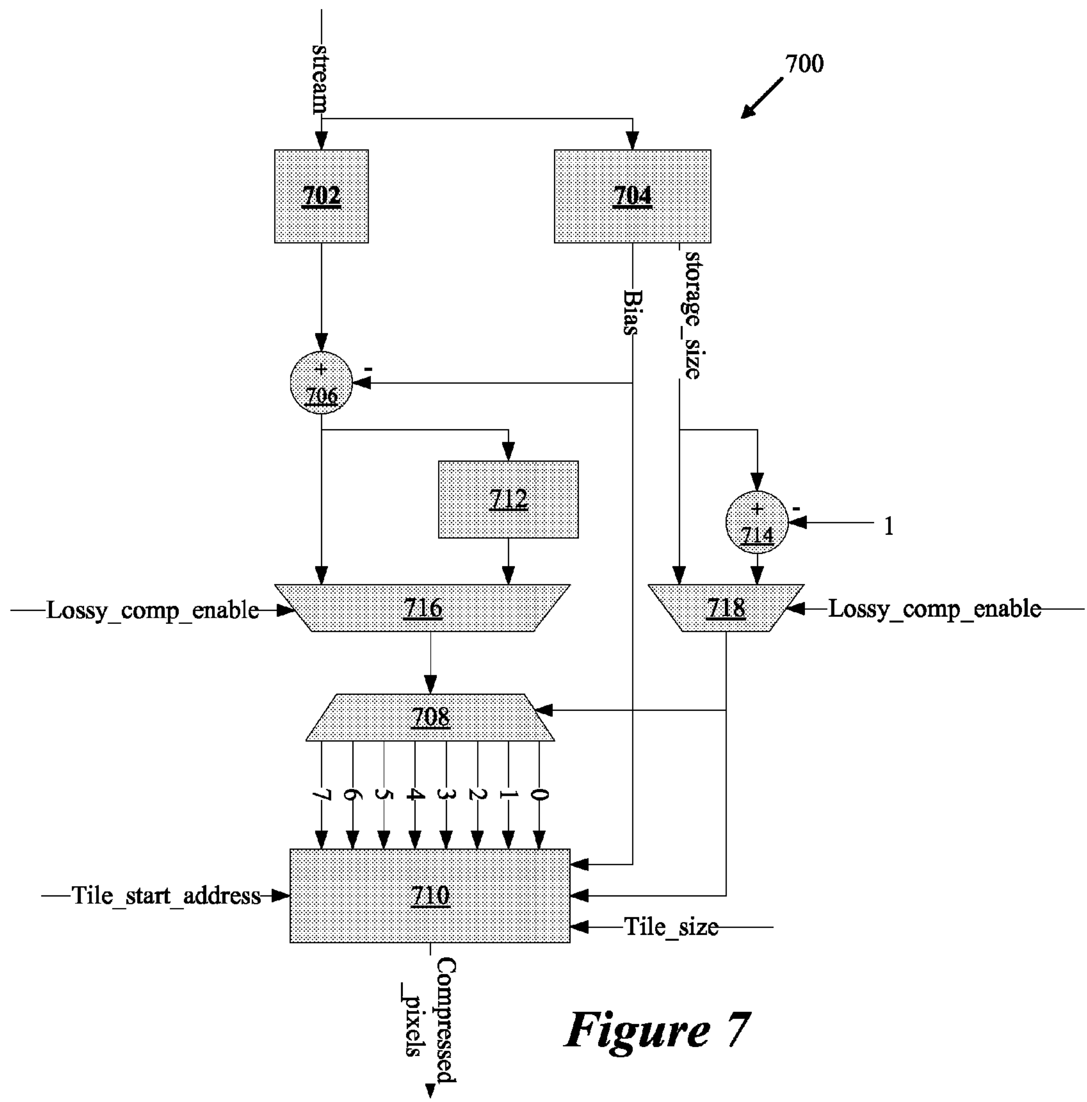
FIG. 7 illustrates a multi stage encoder.

FIG. 7 illustrates an embodiment that includes a first level (lossless) and a second level (lossy) encoder 700. As shown in this figure, the encoder 700 includes a memory 702, a stats block 704, a subtractor 706, a decode unit 708, and a packer 710. These components are preferably coupled and operate as described above in relation to FIG. 5.

The two stage encoder 700 further includes an additional stage that includes a shift module 712, a subtractor 714, and two multiplexers 716 and 718. The two multiplexers receive a lossy_enable signal that selects either the first (lossless) stage encoding only, or both the first (lossless) and second (lossy) stages for encoding. The shift module 712 is typically configured to provide rounding, and/or divide-by-two or truncating operations. As is recognized by one of ordinary skill, dividing is conveniently provided by selectively shifting bits. For instance, a right shift of one bit advantageously results in a divide by two operation upon bits in a register, while a shift of two bits divides by four.

The shift module 712 and the multiplexer 716 are coupled between the subtractor 706 and the decoder 708, such that the multiplexer 716 receives the output of the subtractor 706 and the output of the shift module 712, and provides the output of one or the other to the decoder 708, dependent on the lossy_enable signal.

The subtractor 714 and the multiplexer 718 are coupled between the stats block 704 and the packer 710, such that the multiplexer 718 selects the output of the stats block 704 or the output of the subtractor 714, and provides the selected output to the packer 710 as the storage_size. The subtractor 714 selectively decrements the storage_size by 1, when the lossy stage is enabled.

Figure 8:
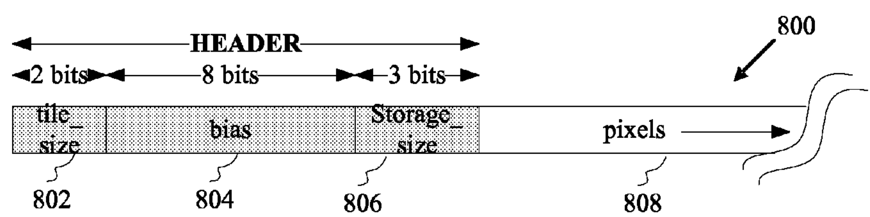
FIG. 8 illustrates a packet for the encoder of FIG. 7.

FIG. 8 illustrates an exemplary packet 800 for the encoder of FIG. 7. The packet 800 includes a header that has fields for tile_size 802, bias 804, and storage_size 806, and a field for pixel data 808. As shown in this figure, the tile_size is advantageously reduced to only two bits, with a tile_size of four pixels by four pixels. Further, the storage_size for each stream is only three bits, after operation of both the lossless and the lossy stages. As mentioned above, the tile_size field is omitted in embodiments having fixed and/or predetermined tile sizes, for additional overhead savings in encoding, transmission, processing, and/or storage.

III. Decoder

Figure 9:
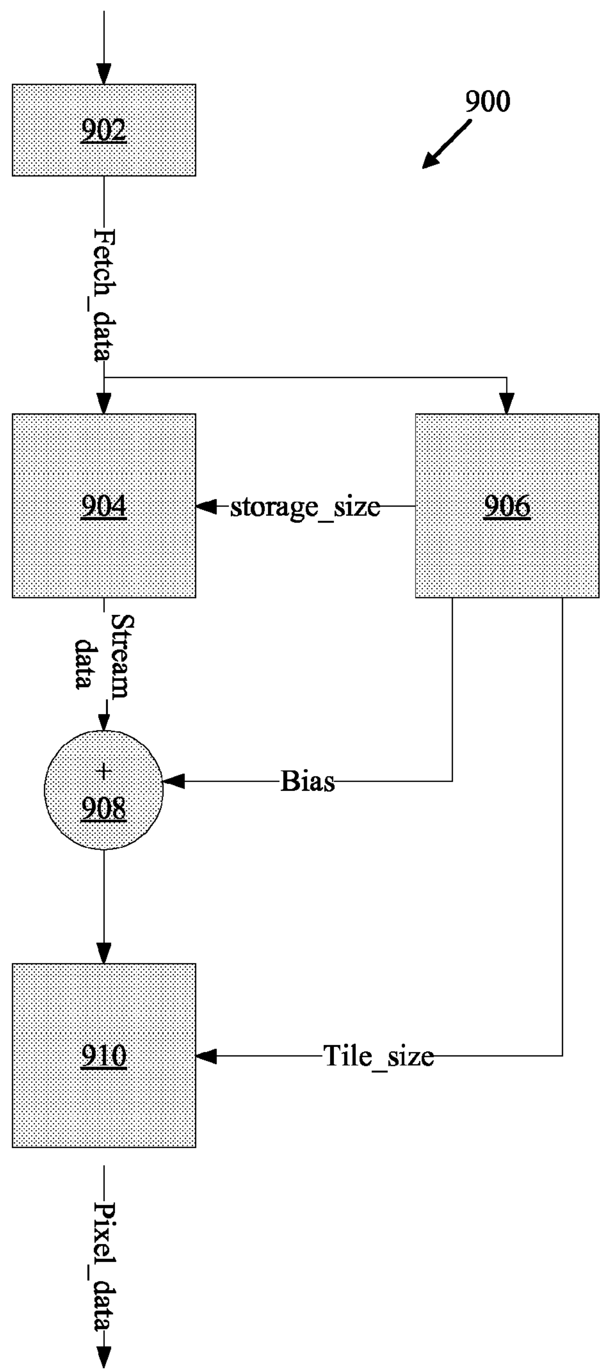
FIG. 9 illustrates a decoder according to embodiments of the invention.

FIG. 9 illustrates a decoder 900 in accordance with some embodiments. As shown in this figure, the decoder 900 includes a data fetch 902 that receives input data, and outputs to an unpacker 904 and a header decode module 906. The unpacker 904 extends any missing leading zeros to form an eight bit wide format for each pixel in the received input data, and outputs the eight bit wide data to an adder 908.

The adder 908 receives the bias from the header decoder 906, which extracts the information contained in the header fields. The adder 908 adds the bias (in eight bit format) to the received value for each pixel, and outputs the summed values to a memory 910. As described above, the received data often comprises a stream for a tile of pixels, hence the memory 910 of these embodiments preferably has the dimensions of the tile of pixels tile_size, as received from the header decode module 906, or alternatively, as predetermined and/or fixed within the system 900. The output of the memory 910 are the decoded pixel values for the particular stream of the particular tile. Hence, the illustrated implementation of the decoder 900 performs the opposite steps of the encoders described above.

Figure 10:
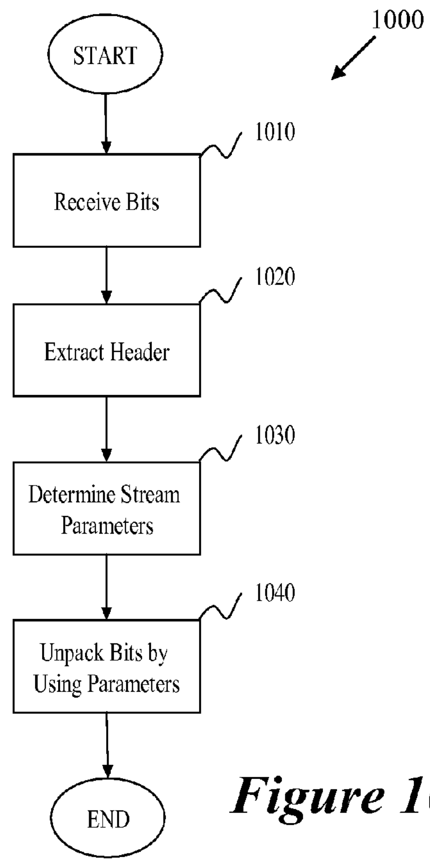
FIG. 10 illustrates a decoding process.

FIG. 10 illustrates a process 1000 that summarizes the steps of the decoder of FIG. 9. The process 1000 begins at the step 1010, where a set of incoming bits are received. Then the process 1000 transitions to the step 1020, where the incoming bits are parsed to extract the header. Once the header is extracted, then the process 1000 transitions to the step 1030, where the bits in the header are used to determine information about a set of parameters for the system such as, for example, a tile_size, a bias, and/or a number of bits used per encoded stream. Next, at the step 1040, the pixel bits are unpacked and added to the bias to result in a decoded pixel value for the particular stream, of the particular tile transmitted in the set of incoming bits. Then, the process 1000 concludes.

IV. Frame Buffer Implementation

Two alternative implementations are presented in this section to take advantage of the encoders and/or compression schemes described above. These implementations include a tightly packed implementation and a loosely packed implementation.

A. Tightly Packed Tiles in Frame Buffer

The first implementation requires that the compressed tiles be packed tightly together in one long stream of bits. The tightly packed tiles are in turn stored tightly in the frame buffer. The tightly packed storage of tiles in the frame buffer efficiently uses storage resources and, further, enables the most efficient use of the bus. For instance, with a tightly packed frame buffer, the data fetch unit in the decoder is able to use the maximum burst size for every transaction on the bus. This tightly packed implementation also efficiently uses memory, and is particularly useful for applications that do not need to access the tiles in the frame buffer randomly. A liquid crystal display (LCD) controller is one such processing block that would use the tightly packed frame buffer.

Figure 11:
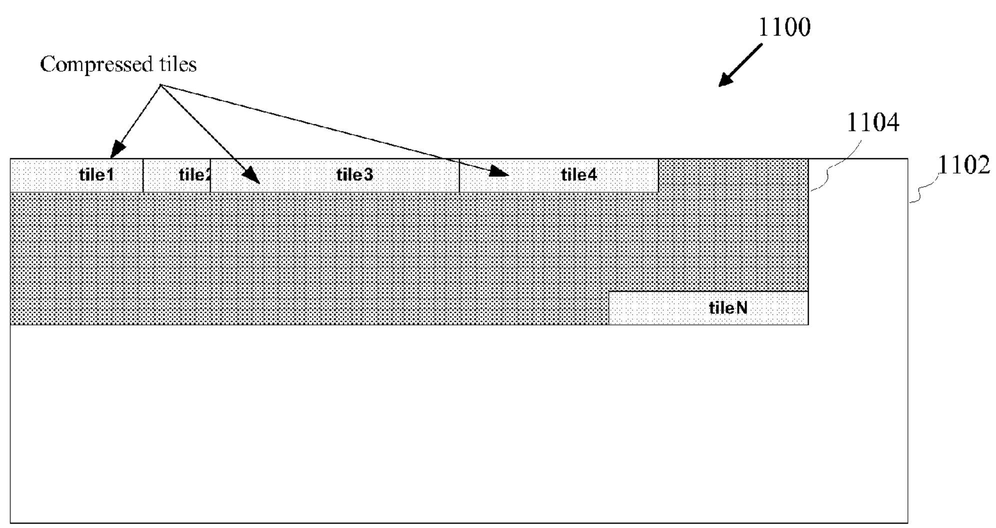
FIG. 11 illustrates tiles tightly packed in a frame buffer.

FIG. 11 illustrates tightly packed tiles in a frame buffer 1100. As shown in this figure, the tightly packed tiles illustratively labeled tile1, tile2, tile3, . . . tileN, have a boundary 1104, that is different than the original frame buffer boundary 1102. Advantageously, the packed tiles have reduced storage requirements.

However, there are disadvantages to having a tightly packed frame buffer. Applications that need to access tiles randomly, require the fetch engine to search from the start of the frame buffer to find the required tile within the tightly packed frame buffer. This results in significant delays and an inefficient use of the bus.

Hence, some embodiments store the compressed tiles in a loosely packed format such that the addresses of the individual tiles can be calculated by using certain parameter, for example, by using tile width, tile height, and/or the y-stride.

B. Loosely Packed Tiles in Frame Buffer

The second implementation scheme places the compressed tiles in memory by using a pre-allocated format. For instance, some of these implementations locate or address each tile starting from a point in memory that is of constant offset in bytes from neighboring tiles or stripes of tiles. The tiles at each pre-allocated address are compressed and require less space in memory for storage than the pre-allocated space.

The advantage of this implementation is that the starting point for each of the tiles or stripe of tiles in the frame buffer is conveniently determined through address calculations by using a particular attribute, such as, for example a y-stride, a tile size, and/or a stripe size. Accordingly, applications have access to the individual tiles in the frame buffer in a random access fashion.

Figure 12:
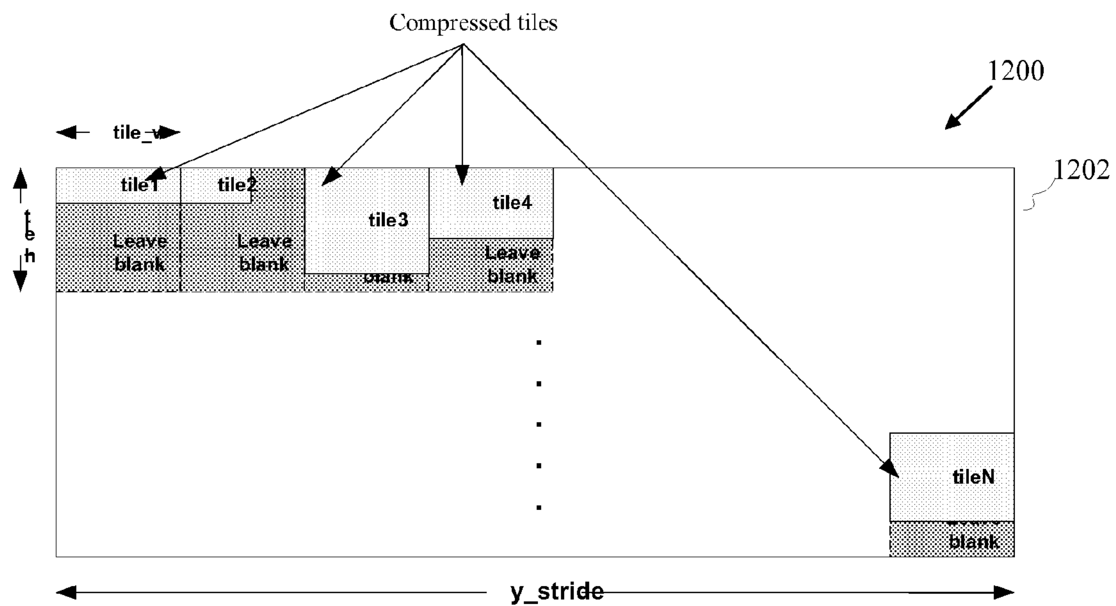
FIG. 12 illustrates tiles loosely packed in a frame buffer.

FIG. 12 illustrates loosely packed tiles in a frame buffer 1200 that has a frame boundary 1202. As shown in this figure, the frame buffer 1200 includes compressed tiles 1 through N, that have variable sizes, but that are located in fixed sized addressable locations. Each addressable location has a predetermined fixed width of tile_w, and height of tile_h. Preferably, the unused space in each addressable location is left blank such that each location is randomly accessible. For the illustration of FIG. 12, a y_stride parameter is defined as the width of the frame buffer, and the pre-allocated address locations occupy a fixed multiple of the width of the frame buffer or y_stride.

Figure 13:
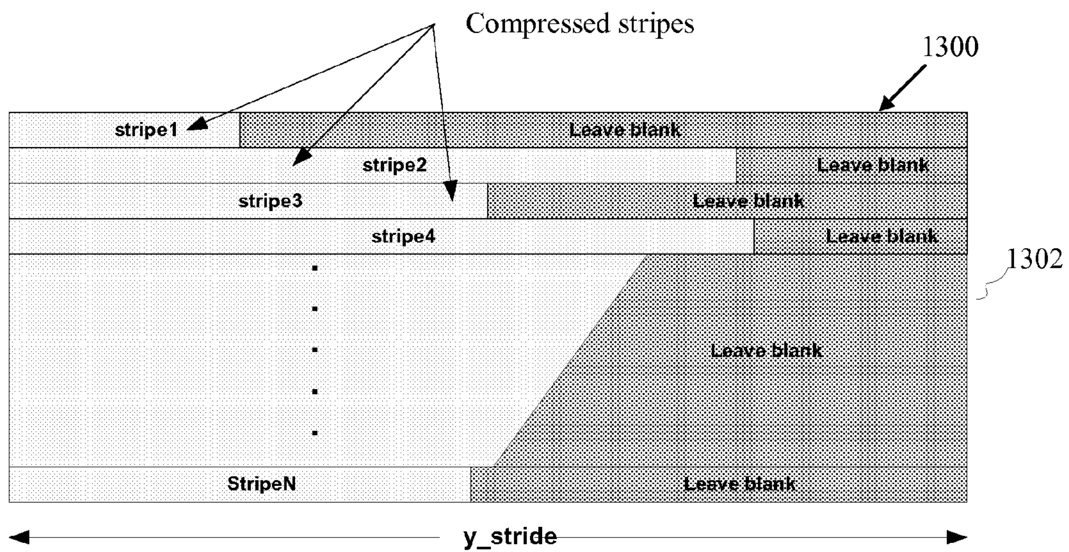
FIG. 13 illustrates stripes in a frame buffer.

FIG. 13 illustrates that the compressed and/or encoded pixel data is alternatively packed into a frame buffer 1300 in striped format. As shown in this figure, the addressable locations for each stripe, striper through stripeN, has fixed dimensions (height and width). For the illustration of FIG. 13, a stripe is defined to be tile_height × frame_width of the frame buffer, while the y_stride is the width of the frame buffer 1300.

To access a tile in a tile boundary based packing scheme, such as illustrated in FIG. 12, only one tile is accessed. However, to access a tile in a stripe boundary based packing scheme, such as illustrated in FIG. 13, the entire stripe must be read and decompressed before operating on the tile. The striping configuration of FIG. 13 has certain advantages. For instance, when the y_stride or image width is about 1024 pixels, then a single stripe preferably contains 256 tiles, for a tile_size of four by four pixels. In this configuration, a page load of, for example, SDRAM advantageously loads all 256 tiles, which is a more efficient use of the bus, memory, and page loads. The efficiency is both in terms of speed of image loading, and in terms of power efficiency, since each load and/or refresh of page memory requires power and/or delay due to a latency.

V. Results

Several different images of RGB888 format were compressed using code written in MATLAB and the compression ratios compared to results produced by another lossless compression scheme, namely, conventional run length encoding. Several different tile sizes were used during the simulations, and the 4×4 tile size similar to the examples described above yielded good results. Table 1 below shows the comparisons between conventional RLE24 encoding and embodiments of the invention, including the Level1 (lossless), as well as Level2 (lossy) encoding schemes described above.

Figure 14:
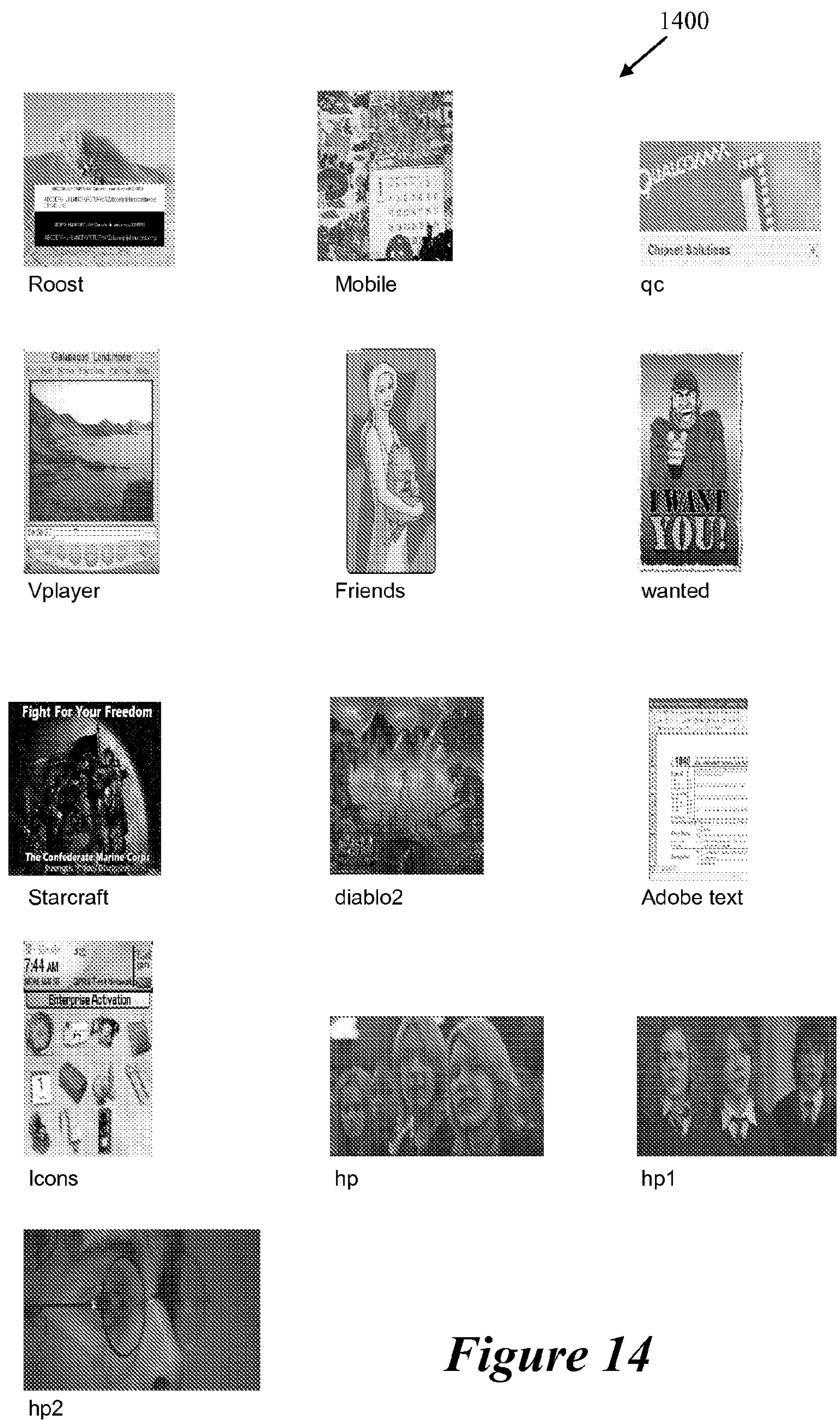
FIG. 14 illustrates several test images according to embodiments of the invention.

As shown in the Table 1, some of the test images used to evaluate the tile compression scheme include roost, mobile, qc, vplayer, friends, wanted, starcraft, diablo2, Adobe text, icons, hp, hp1, and hp2. These images are visually presented as an unpacked and decoded group 1400 in FIG. 14, which indicates little or no perceivable loss of visual quality.

Table 1 below presents exemplary results obtained by using conventional RLE24 encoding versus the tile encoding methods of some embodiments. One of ordinary skill recognizes variations in the compression ratios for alternative embodiments. For instance, some implementations of the invention have shown even greater compression ratios.

| Images | 1st level Tile compression (4 × 4 tile) | 2nd level Tile compression (4 × 4 tile) | RLE24 (Line based compression) |
|---|---|---|---|
| roost | 49.7% | 41.2% | 67.9% |
| mobile | 85.8% | 74.2% | 99.6% |
| qc | 71.1% | 60.5% | 87.3% |
| vplayer | 66.6% | 56.1% | 83.2% |
| friends | 23.0% | 19.2% | 8.0% |
| wanted | 63.4% | 53.7% | 89.2% |
| starcraft | 65.7% | 55.7% | 89.8% |
| diablo2 | 66.8% | 56.0% | 96.0% |
| Adobe text | 45.0% | 38.8% | 19.9% |
| icons | 73.7% | 62.4% | 78.0% |
| hp | 62.6% | 52.0% | |
| hp1 | 58.3% | 48.3% | |
| hp2 | 49.4% | 40.6% | |

The Level1 and Level2 (lossy) implementations are further advantageously applied to motion picture images or video. Table 2 presents the application of embodiments described above to YCbCr420 movie clips. As noted in Table 2, the test movie clips are listed in the left column, while the compression ratio for each clip is reported in the right column, and is averaged over 100 frames.

| Images | Lossy Tile compression (4 × 4 tile) (averaged over 100 frames) |
|---|---|
| italianjob_qvga.yuv | 50.3% |
| coastguard_qvga.yuv | 61.7% |
| mobile_qvga.yuv | 69.7% |
| Stefan_qvga.yuv | 64.4% |
| Football_qvga.yuv | 54.2% |
| Foreman_qvga.yuv | 54.2% |
| mother_daughter_qvga.yuv | 48.3% |
| singer_qvga.yuv | 56.9% |

The decompressed movie clips of Table 2 that were encoded (and decoded) with the lossy compression scheme of the embodiments described above are generally available through the Internet or another source.

In Tables 1 and 2, the maximum error in color is one least significant bit (LSB), or one quantization level, for colors having pixel coefficient values that have odd valued remainder values as a result of the subtraction of the bias. There is no error for colors having pixels that have even valued remainder values after the subtraction of the bias. Moreover, there is no noticeable artifact in the images even for the Level2 (lossy) compression. Accordingly, implementations of the invention provide compression without a significant tradeoff in quality. The compression ratio advantageously achieved by some embodiments is given below.

$$\text{Compression ratio} = \frac{\text{total\_bits\_in\_compressed\_frame} + \text{header\_bits}}{\text{total\_bits\_in\_uncompressed\_frame}} * 100$$

Some embodiments further improve the compression ratio given above by also removing redundant information in the header portion of the data packet, while some embodiments forego the inclusion of fixed parameters such as, for example, an optional tile_size parameter. Moreover, embodiments of the invention have particular advantages over the art in terms of multilevel enhanced encoding and/or compression. For instance, as presented in the tables, the YCrCb examples showed even greater compression than the RGB examples. This is since the YCrCb format is itself an encoded format, and the embodiments described above allow for significant additional multilevel encoding improvements over an existing encoded format.

Figure 15:
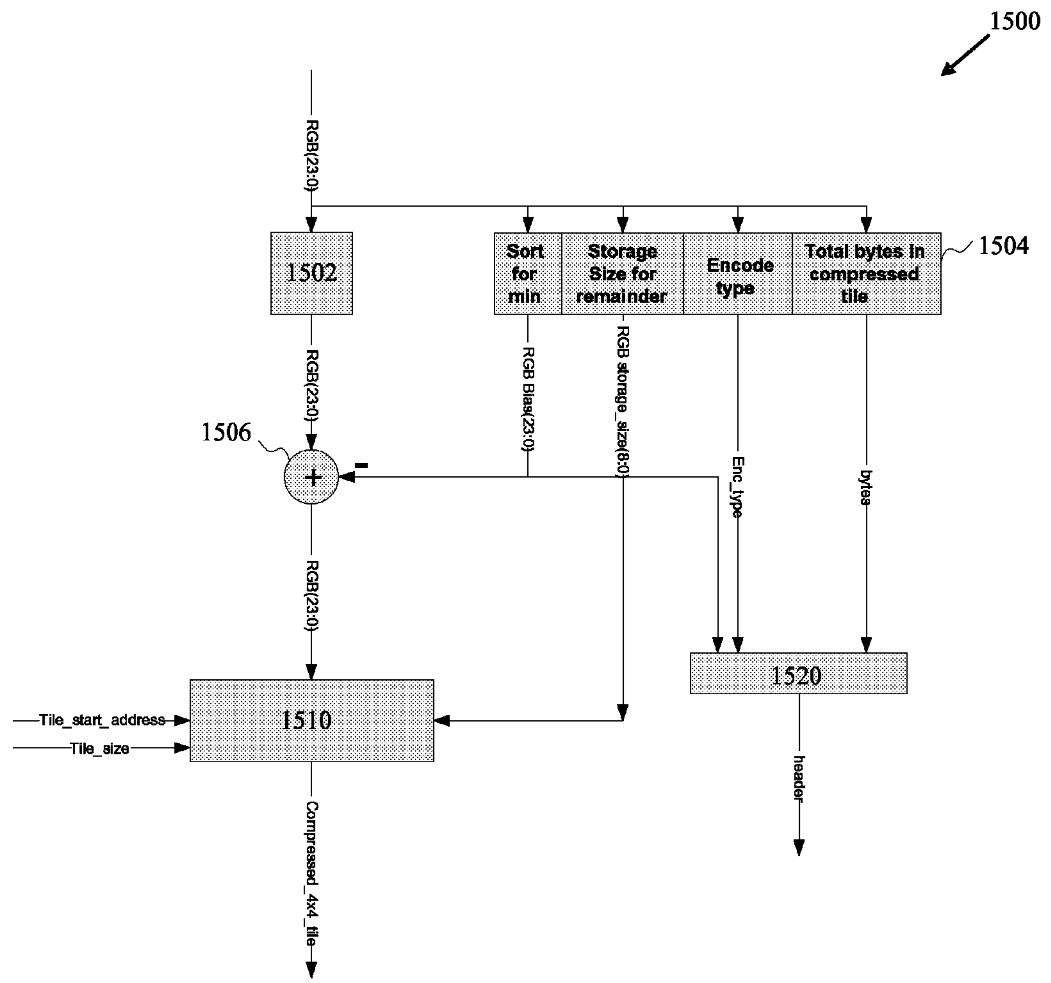
FIG. 15 illustrates an alternative encoding system of some embodiments.

Additional embodiments are further described herein. For instance, FIG. 15 illustrates an alternative encoding system 1500 of some embodiments. As shown in this figure, the encoding system 1500 includes a memory 1502 and a stats block 1504, which each receive an input data stream. In this implementation, the data includes 24 bits, or eight bits for each of three colors, RGB, YCrCb, and the like. The memory 1502 typically comprises a type of random access memory (RAM) that has sufficient dimensions to store the stream values for a tile, while the stats block 1504 is for sorting the values of the tile from low to high, for example. In a particular implementation the memory 1502 is for receiving 4×4 tiles.

Figure 17:
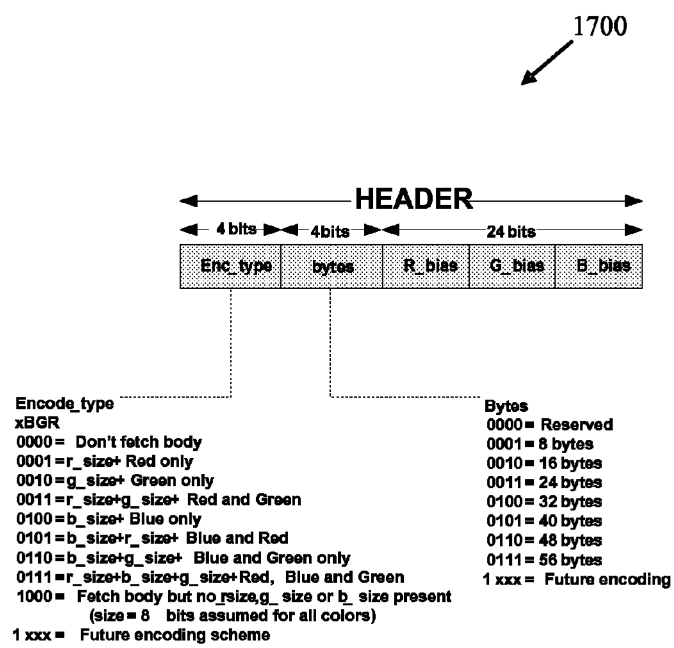
FIG. 17 illustrates an exemplary header for the encoding of FIG. 15 and/or the packet of FIG. 16.

The stats block 1504 advantageously determines a variety of useful values. For instance, the stats block 1504 sorts the incoming tri-chromatic data values, and preferably uses the minimum coefficient of each color as a bias value for the color. The bias values are output by using 24 bits, or eight bits for each color. The stats block 1504 further determines the storage size for the remainder, which it outputs to a packer by using nine bits. The stats block 1504 determines an encode_type and a total bytes in the compressed tile and outputs these to a header module 1520. The header module 1520 also receives the bias values from the stats block 1504 and generates a header, which is shown in FIG. 17.

The memory 1502 outputs to a subtractor 1506 that also receives a bias input from the stats block 1504. Typically, the bias comprises the lowest value in the tile as determined by the stats block 1504. The subtractor 1506 subtracts the bias from the stream values from the memory 1502, and outputs to a packer 1510. The packer 1510 also receives a tile_start_address, the bias, a storage_size, and a tile_size (from the stats block 1504), and outputs a compressed data stream for the particular tile. The output preferably comprises the minimum number of bits needed based on the storage_size received from the stats block 1504. One of ordinary skill recognizes different implementations for the packer 1510 and other components of the system 1500, including variations in bus widths and number of bits.

Preferably, the output of the packer 1510 is in the form of one or more packets. The packets of these embodiments are further described in relation to FIG. 16, while the header is illustrated in FIG. 17.

Figure 16:
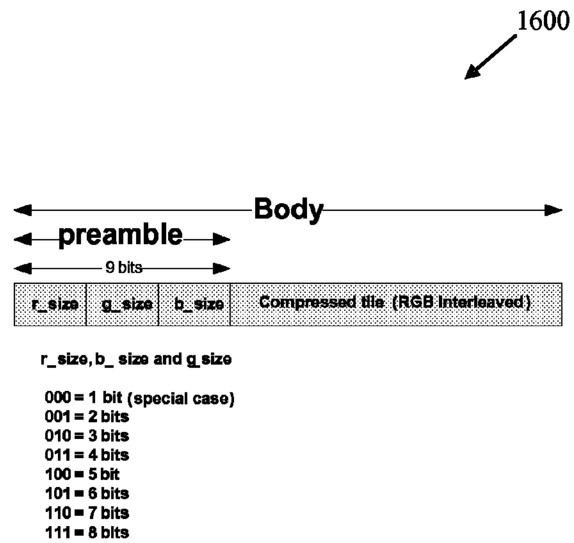
FIG. 16 illustrates an exemplary packet for the encoding of FIG. 15.

FIG. 16 illustrates an exemplary packet 1600 for the encoding of FIG. 15. The packet 1600 includes a body that preferably has a preamble of nine bits, or three bits for each color such as, for example, r_size, g_size, and b_size. As shown in this figure, the size needed for each color is advantageously encoded by using a three-bit code format. More specifically, the number of bits to encode each color varies from one to eight bits, depending on the code (e.g., 000 for one bit, or 111 for eight bits). The body further includes the data for a compressed tile, such as in RGB interleaved format, for instance.

FIG. 17 illustrates an exemplary header 1700 for the encoding of FIG. 15 and/or the packet of FIG. 16. As shown in this figure, the header 1700 includes encode_type, number-of-bytes, and tri-chromatic bias values. In this implementation, the header 1700 uses, for example, four bits for encode_type, plus four bits for the number-of-bytes, plus 24 bits or eight bits for the bias of each of three colors. One of ordinary skill, however, recognizes alternatives for the header of different implementations. As shown in the figure, the number-of-bytes field represents sizes in multiples of eight that are from eight-bytes (0001) to 56 bytes (0111). Similarly, the encode_type field allows for multiple encoding schemes, as shown in the figure.

Figure 18:
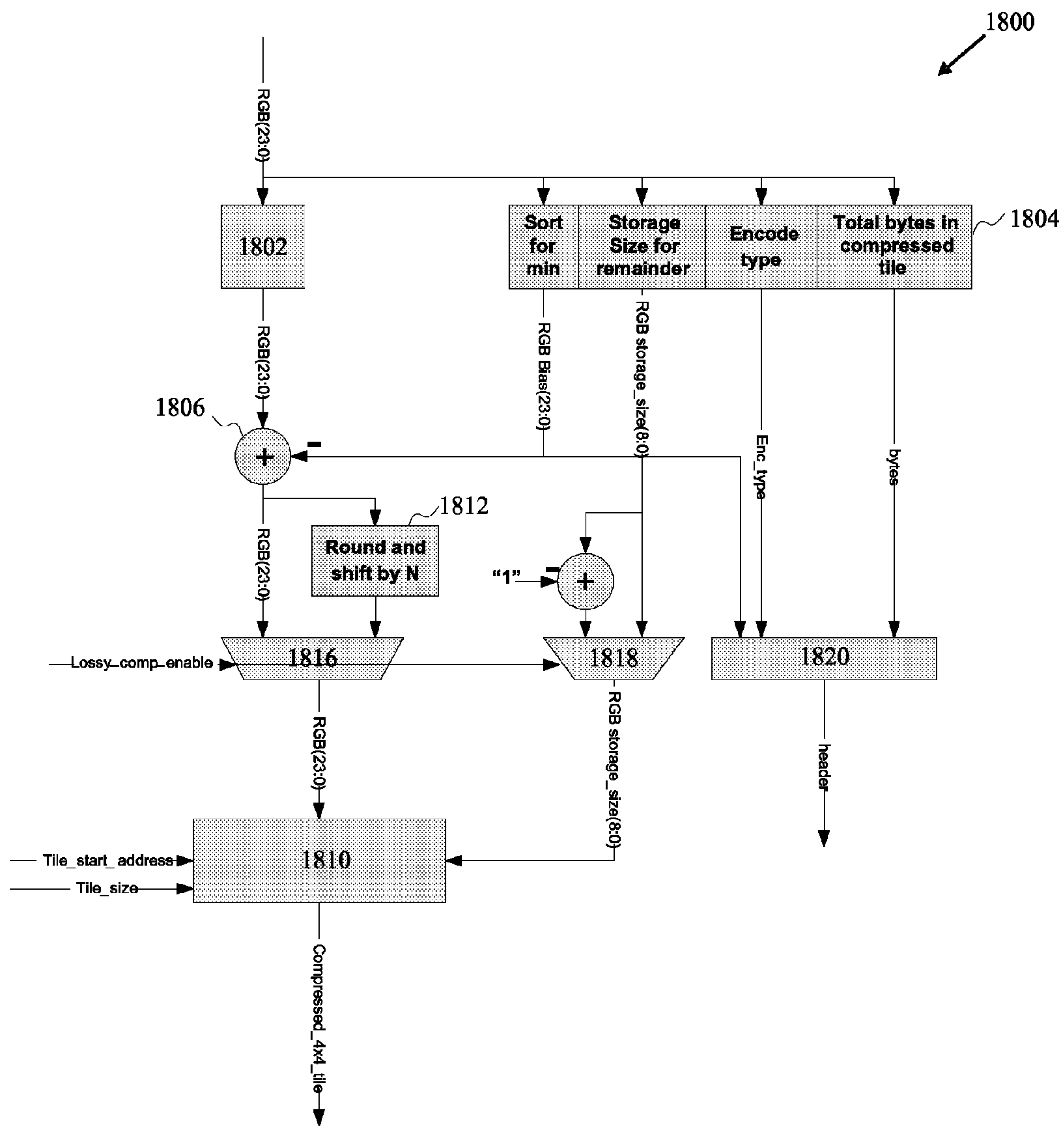
FIG. 18 illustrates an encoding system of some embodiments.

FIG. 18 illustrates an encoding system 1800 of some embodiments. More specifically, FIG. 18 illustrates an embodiment that includes a first level (lossless) and a second level (lossy) encoder 1800. As shown in this figure, the encoder 1800 includes a memory 1802, a stats block 1804, a subtractor 1806, and a packer 1810. These components are preferably coupled and operate as described above in relation to FIG. 15.

For instance, the memory 1802 and the stats block 1804 each receive an input data stream. In some implementations, the data includes 24 bits, or eight bits for each of three tri-chromatic colors, RGB, YCrCb, and the like. The memory 1802 typically comprises a type of random access memory (RAM) that has sufficient dimensions to store the stream values for a tile, while the stats block 1804 is for sorting the values of the tile from low to high, for example. In a particular implementation, the memory 1802 is for receiving 4×4 tiles.

The stats block 1804 advantageously determines a variety of useful values. For instance, the stats block 1804 sorts the incoming tri-chromatic data values, and preferably uses the minimum coefficient of each color as a bias value for the color. The stats block 1804 preferably outputs the bias values by using 24 bits, or eight bits for each color. The stats block

1804 further determines the storage size for the remainder, which it outputs by using nine bits to a subtractor 1814 and a multiplexer 1818, which are further described below. The stats block 1804 determines an encode_type and a total of bytes in the compressed tile and outputs these to a header module 1820. The header module 1820 also receives the bias values from the stats block 1804 and generates a header, which is shown in FIG. 20.

The memory 1802 outputs to a subtractor 1806 that also receives a bias input from the stats block 1804. Typically, the bias comprises the lowest value in the tile as determined by the stats block 1804. The subtractor 1806 subtracts the bias (received via the stats block 1804) from the stream values from the memory 1802, and outputs to a multiplexer 1816 and a shifter 1812. The multiplexer 1816 selects the output of the subtractor 1806 or the ouptut of the shifter 1812 based on a lossy compression enable signal (lossy_comp_enable) and outputs to a packer 1810. The packer 1810 also receives a Tile_start_address, a Tile_size, and the storage_size (via the stats block 1804), and outputs the minimum number of bits needed based on the storage_size received from the stats block 1804. However, one of ordinary skill recognizes different implementations for the packer 1810 and other components of the system 1800, including variations in bus widths and number of bits.

As described above, the packer 1810 outputs a compressed data stream for the particular tile. Preferably, the output of the packer 1810 is in the form of one or more packets. The packets of these embodiments are further described in relation to FIG. 19, while the header is illustrated by FIG. 20.

Hence, the two stage encoder 1800 further includes an additional stage that includes the shift module 1812, the subtractor 1814, and the two multiplexers 1816 and 1818. The two multiplexers receive a lossy_comp_enable signal that selects either the first (lossless) stage encoding only, or both the first (lossless) and second (lossy) stages for encoding. The shift module 1812 is typically configured to provide rounding, and/or divide-by-two or truncating operations. As is recognized by one of ordinary skill, dividing is conveniently provided by selectively shifting bits. For instance, a right shift of one bit advantageously results in a divide by two operation upon bits in a register, while a shift of two bits divides by four.

The shift module 1812 and the multiplexer 1816 are coupled between the subtractor 1806 and the packer 1810, such that the multiplexer 1816 receives the output of the subtractor 1806 and the output of the shift module 1812, and provides the output of one or the other to the packer 1810, dependent on the lossy_comp_enable signal.

The subtractor 1814 and the multiplexer 1818 are coupled between the stats block 1804 and the packer 1810, such that the multiplexer 1818 selects the output of the stats block 1804 or the output of the subtractor 1814, and provides the selected output to the packer 1810 as the storage_size. As further illustrated in the figure, the subtractor 1814 selectively decrements the storage_size by one, when the lossy stage is enabled. One of ordinary skill recognizes that alternative embodiments decrement the storage size by different amounts such as, for example, 1, 2, 3, 4, or by another number N.

FIG. 19 illustrates an exemplary packet 1900 for the encoding of FIG. 18. The packet 1900 includes a body that preferably has a preamble of nine bits, or three bits for each color such as, for example, r_size, g_size, and b_size. As shown in this figure, the size needed for each color is advantageously encoded by using a three-bit code format. More specifically, the number of bits to encode each color varies from one to eight bits, depending on the code (e.g., 000 for one bit, or 111 for eight bits). The body further includes the data for a compressed tile, such as in RGB interleaved format, for instance.

FIG. 20 illustrates an exemplary header for the encoding of FIG. 18 and/or the packet of FIG. 19. As shown in this figure, the header 2000 includes encode_type, number-of-bytes, and tri-chromatic bias values. In this implementation, the header 2000 uses, for example, four bits for encode_type, plus four bits for number-of-bytes, plus 24 bits or eight bits for the bias of each of three colors. One of ordinary skill, however, recognizes alternatives for the header of different implementations. As shown in the figure, the number-of-bytes field represents sizes, for example, by using four bit codes, in multiples of eight bytes from eight bytes (0001) to 56 bytes (0111). Similarly, the encode_type field allows for multiple encoding schemes, as shown in the figure. Accordingly, the headers and/or packets of different implementations contain fields and flexibility to handle the outputs of single stage and/or multi stage encodings such as, for example, lossy and/or lossless encoding stages. The decoding systems of particular embodiments are similarly configured to handle a variety of encodings as well.

Figure 21:
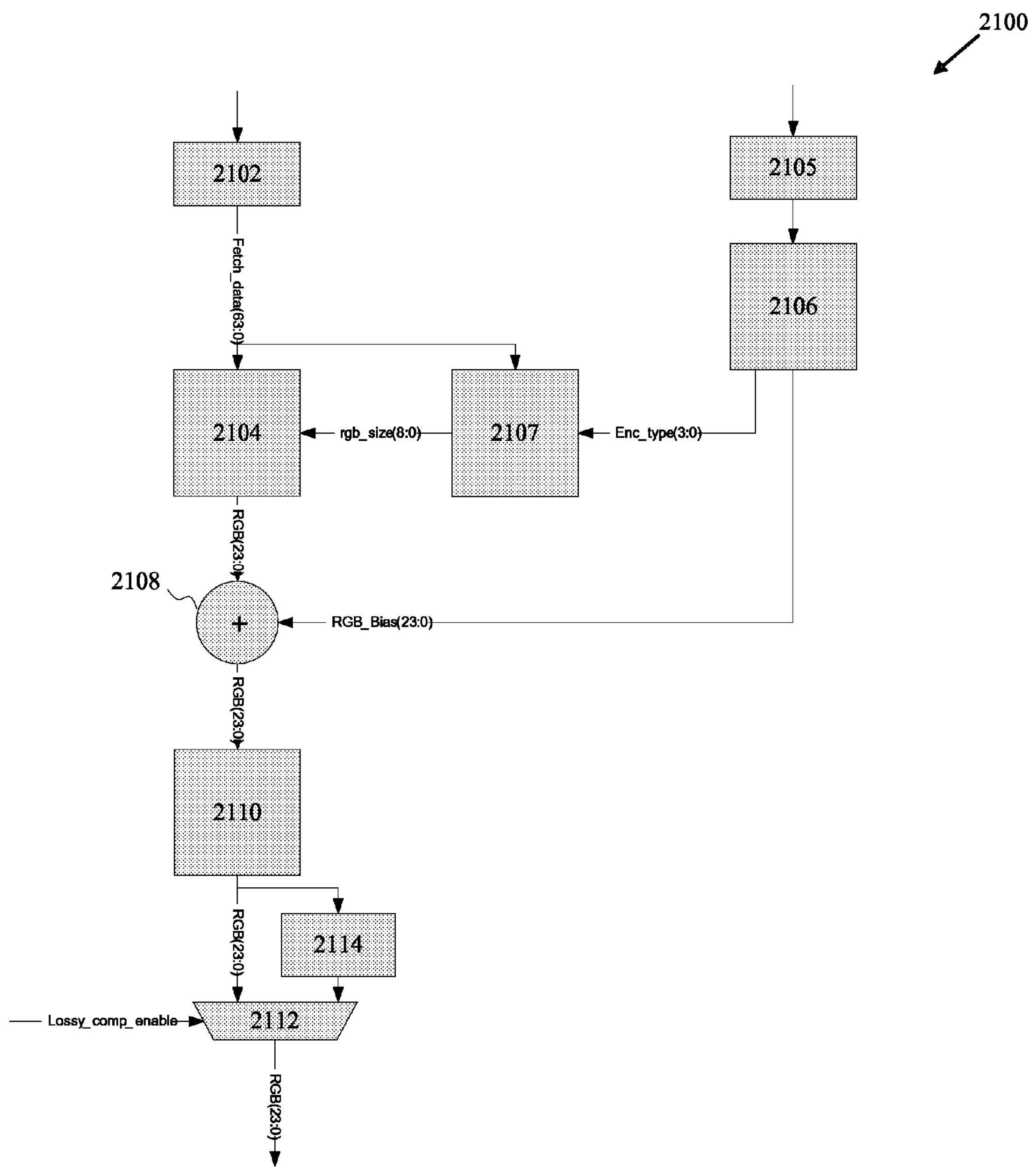
FIG. 21 illustrates a decoding system of some embodiments.

For instance, FIG. 21 illustrates a decoding system 2100 of some embodiments. As shown in this figure, the decoder 2100 includes a body fetch 2102 that receives input data typically in the form of packets, and outputs the body of the packets to an unpacker 2104 and a preamble decode module 2017. A header fetch 2105 also receives the input data, and outputs to a header decode module 2106 that preferably parses the headers. For instance, a particular header decode module 2106 outputs four bits of encode_type to the preamble decode module 2107, and 24 bits of bias (eight bits for each of three tri-chromatic colors) to an adder 2108.

The preamble decode module 2107 outputs nine bits to the unpacker 2104. The nine bits preferably indicate the size for each of the three tri-chromatic colors in a three-bit code format such as, for example, rgb_size for systems using red, green, blue. The unpacker 2104 extends any missing leading zeros to form an eight bit wide format for each pixel in the received input data, and outputs the eight bit wide data to the adder 2108 mentioned above.

The adder 2108 receives the bias from the header decoder 2106, which extracts the information contained in the header fields. The adder 2108 adds the bias (in eight bit format) to the received value for each pixel, and outputs the summed values to a memory 2110. As described above, the received data often comprises a stream for a tile of pixels, hence the memory 2110 of these embodiments preferably has the dimensions of the tile of pixels, or of the tile_size, as received from the header decode module 2106, or alternatively, as predetermined and/or fixed within the system 2100, and thereby advantageously reducing the need to transmit these fixed sizes.

The output of the memory 2110 is the decoded pixel values for the particular stream of the particular tile. For instance, some embodiments output 24 bits that include eight bits for each of three colors. The memory 2110 preferably outputs to a multiplexer 2112 and a shifter 2114 such as, for example, a multiply-by-N shifter that outputs to the multiplexer 2112. The multiplexer 2112 selects the output of the memory 2110 or the shifted output (via the multiplexer 2114), based on a lossy compression enable signal (lossy_comp_enable). Hence, the illustrated implementation of the decoder 2100 performs the opposite steps of the encoders 1500 and 1800 described above in relation to FIGS. 15 and 18, and further selectively provides for decoding of lossless and/or lossy encodings.

Figure 22:
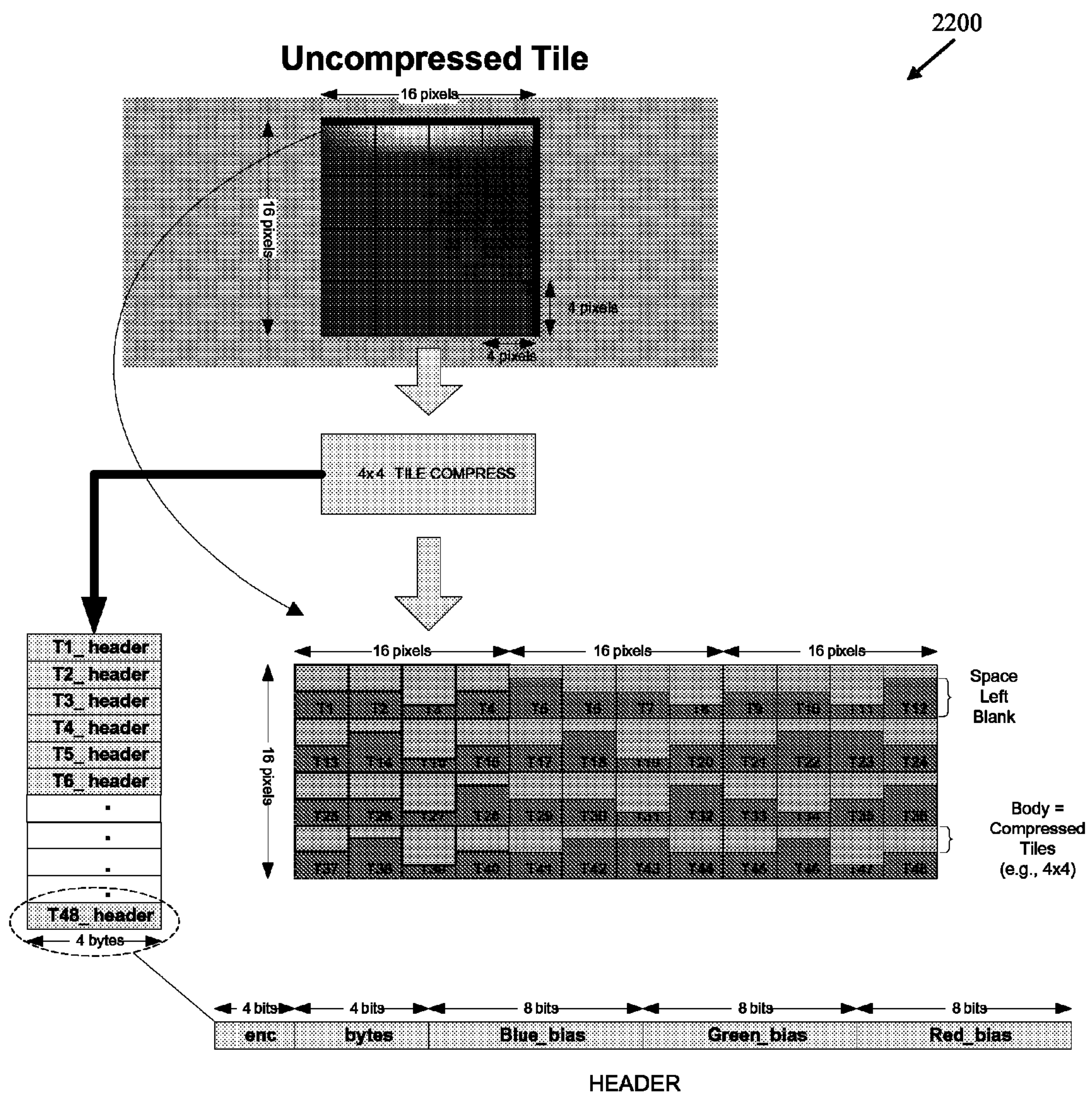
FIG. 22 illustrates an exemplary encoded format.

FIG. 22 illustrates an exemplary encoded format 2200. As shown in this figure, uncompressed tiles are advantageously compressed into a smaller format, for instance, by using some of the embodiments described above. A particular implementation compresses a 16×16 uncompressed tile into a 4×4 compressed tile. Each tile preferably includes a header of four bytes, for example. In an implementation, the header uses three bytes for the bias for each of three tri-chromatic colors, or eight bits for each of a blue_bias, a green_bias, and a red_bias. One byte is for the encode_type and the number-of-bytes fields. In this case, each of these fields uses four bits of the byte for the two fields.

In the illustrated example, 48 tiles are advantageously compressed and then packed into a frame buffer. More specifically, the illustrated implementation 2200 uses the loosely packed format, which includes the advantages of speed and random access described above. Further, in the loosely packed implementation, the unused space that is allocated for each tile is intentionally left blank. The particular frame buffer illustrated is twelve tiles wide and four tiles high. Hence for tiles having 4×4 pixels, the frame buffer is 16 pixels wide times three, or 48 pixels wide, and 16 pixels high.

Those of skill in the art would understand that information and signals may be represented by using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, a personal computer, or a mobile computing and/or telecommunications device. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For instance, various embodiments have been described in relation to image and/or video data for mobile devices. However, one of ordinary skill recognizes other data types, and other platforms, as well. Thus, the present invention is not intended to be limited to the embodiments shown herein but is to be accorded the widest scope consistent with the principles and novel features disclosed herein.

What is claimed is:

1. A method of encoding comprising:

receiving an image at a processor;

tiling, via the processor, the image into a set of tiles, wherein each tile comprises a set of pixels;

selecting, via the processor, a first tile;

determining, via the processor, a first set of values for the pixels in the first tile;

separating, via the processor, the determined value of each pixel in the first tile into a plurality of streams;

for a first stream of the plurality of streams, determining, via the processor, a bias value; and subtracting, via the processor, the bias value from each value within the first stream, thereby generating a set of subtracted values, wherein the first stream comprises a set of coefficients indicating a first color for the pixels of the first tile, the method further comprising:

for the first stream, determining, via the processor, whether the bias value includes coefficient information to reconstruct the first color; and if the bias value includes coefficient information to reconstruct the first color, then:

encoding, via the processor, the first color into a packet header by using the bias value;

foregoing an encoding of the coefficients for the first color within a packet body; and selecting, via the processor, an encoding type indicating whether a header includes sufficient pixel information to reconstruct the first color of the first tile.

2. The method of claim 1, the subtracted values comprising one or more leading zeros, the method further comprising:

removing, via the processor, one of the leading zeros, thereby reducing the number of bits required to represent the subtracted values within the first stream; and representing, via the processor, a value within the first stream with fewer bits.

3. The method of claim 1, further comprising:

for the values in the first stream, determining, via the processor, a minimum value, wherein the bias value comprises the minimum value.

4. The method of claim 1, further comprising:

rounding, via the processor, the subtracted values thereby generating a set of rounded values; and dividing, via the processor, the rounded values by a factor.

5. The method of claim 4, wherein the factor comprises a multiple of two, wherein the dividing is performed by using a shift operation, such that an N-bit lossy encoder is implemented via the processor, wherein N is the number of least significant bits shifted.

6. The method of claim 1, wherein the plurality of streams comprises a stream for each of red, green, and blue.

7. The method of claim 1, wherein the plurality of streams comprises Y, Cr, Cb.

8. The method of claim 1, further comprising:

packing, via the processor, an encoded set of the tiles within a frame buffer.

9. The method of claim 8, wherein the tiles are packed tightly such that the space occupied by each tile is variable.

10. The method of claim 8, wherein the tiles are packed in predetermined addressable locations.

11. The method of claim 1, further comprising:

fetching, via the processor, the packet header;

receiving, at the processor, the encoding type; and decoding, via the processor, the first color by using the encoding type, wherein if the encoding type indicates that the packet header includes coefficient information to reconstruct the first color, then the method foregoes a step of fetching the information for the first color from the packet body.

12. The method of claim 1, the encoding type comprising at least one of:

a first selection for a condition where no color information for the first tile is encoded in the packet body;

a second selection for a condition where the information for one color is encoded in the packet body;

a third selection for a condition where the information for two colors is encoded in the packet body;

a fourth selection for a condition where the information for three colors is encoded in the packet body.

13. The method of claim 1, wherein the coefficient information comprises one of a luminance value and a chrominance value.

14. A non-transitory computer readable medium storing a program for encoding, the program comprising instructions for:

receiving an image;

tiling the image into a set of tiles, wherein each tile comprises a set of pixels;

selecting a first tile;

determining a first set of values for the pixels in the first tile;

separating the determined value of each pixel in the first tile into a plurality of streams;

for a first stream of the plurality of streams, determining a bias value; and subtracting the bias value from each value within the first stream, thereby generating a set of subtracted values wherein the first stream comprises a set of coefficients indicating a first color for the pixels of the first tile, the program further comprising instructions for:

for the first stream, determining whether the bias value includes coefficient information to reconstruct the first color; and if the bias value includes coefficient information to reconstruct the first color, then:

encoding the first color into a packet header by using the bias value;

foregoing an encoding of the coefficients for the first color within a packet body; and selecting an encoding type indicating whether a header includes pixel information to reconstruct the first color of the first tile.

15. An image compression system, the system comprising:

means for receiving an image;

means for tiling the image into a set of tiles, wherein each tile comprises a set of pixels;

means for selecting a first tile;

means for determining a first set of values for the pixels in the first tile;

means for separating the determined value of each pixel in the first tile into a plurality of streams;

for a first stream of the plurality of streams, means for determining a bias value;

means for subtracting the bias value from each value within the first stream, thereby generating a set of subtracted values, wherein the first stream comprises a set of coefficients indicating a first color for the pixels of the first tile;

for the first stream, means for determining whether the bias value includes coefficient information to reconstruct the first color; and if the bias value includes coefficient information to reconstruct the first color, then:

means for encoding the first color into a packet header by using the bias value;

means for foregoing an encoding of the coefficients for the first color within a packet body; and means for selecting an encoding type indicating whether a header includes sufficient pixel information to reconstruct the first color of the first tile.

16. An encoder comprising a first stage including:

a memory that receives a set of input data;

a stats block that receives the set of input data, the stats block configured to sort the input data;

a first subtractor coupled to an output of the memory and an output of the stats block, wherein the first subtractor performs an arithmetic operation on the output of the memory and the output of the stats block;

a first logic unit coupled to the subtractor, wherein the first logic unit receives the output of the subtractor and outputs outputting a plurality of bits; and a packer coupled to the logic unit that receives the plurality of bits and forms a data packet, wherein the first logic unit is configured to output a reduced number of bits based on a particular data stream, the encoder further comprising a second stage including:

a second logic unit coupled to an output of the first subtractor, wherein the second logic unit performs a rounding function and a divide function;

a first multiplexer coupled to the first subtractor and the second logic unit, wherein the first multiplexer selectively provides the output of the first subtractor and the second logic unit;

a second subtractor coupled to an output of the stats block, wherein the second subtractor decrements by one;

a second multiplexer coupled to the stats block and the second subtractor, wherein the second multiplexer selectively provides the output of the stats block and the second subtractor;

a lossy_enable line coupled to each of the first and second multiplexers, wherein:

when the lossy_enable line has one state, the first multiplexer provides the output of the first subtractor, and the second multiplexer provides the output of the stats block, when the lossy_enable line has another state, the first multiplexer provides the output of the second logic unit, and the second multiplexer provides the output of the second subtractor.

17. The encoder of claim 16, wherein the memory receives a data stream from a tile, wherein the tile comprises one or more data streams, wherein the memory is sized based on the data stream from the tile.

18. The encoder of claim 16, wherein the arithmetic operation comprises subtracting the output of the stats block from the output of the memory thereby generating a set of subtracted values, the subtracted values comprising one or more leading zeros, wherein the encoder:

removes a leading zero, thereby reducing the number of bits required to represent the subtracted values within the first stream; and represents a value within the first stream with fewer bits.

19. The encoder of claim 16, wherein the first logic unit comprises a decode unit, such that the number of bits output by the decode unit is determined by a control input for the decode unit, the control input provided by the stats block.

20. The encoder of claim 16, wherein the stats block determines a bias value by using the values in the input data, and wherein the stats block further provides a bias value for subtraction by the first subtractor.

21. The encoder of claim 16, further comprising a frame buffer, wherein the encoder packs an encoded set of tiles within the frame buffer.

* * * * *